(12) United States Patent
Wang et al.

(10) Patent No.: US 11,735,751 B1
(45) Date of Patent: Aug. 22, 2023

(54) INTELLIGENT FUEL CELL SYSTEMS AND CONTROL LOGIC FOR SMART USE OF ANODE HEADER DRAIN VALVES FOR FCS BLEED AND DRAINAGE

(71) Applicant: GM GLOBAL TECHNOLOGY OPERATIONS LLC, Detroit, MI (US)

(72) Inventors: Xiaofeng Wang, Troy, MI (US); Sergio E. Garcia, Commerce Township, MI (US); Chad Dubois, Oxford, MI (US); Manish Sinha, St. Petersburg, FL (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/699,485

(22) Filed: Mar. 21, 2022

(51) Int. Cl.
*H01M 8/04664* (2016.01)
*H01M 8/04119* (2016.01)

(52) U.S. Cl.
CPC ... *H01M 8/04179* (2013.01); *H01M 8/04664* (2013.01); *H01M 2220/20* (2013.01)

(58) Field of Classification Search
CPC ......... H01M 8/04179; H01M 8/04664; H01M 2220/20
See application file for complete search history.

(56) References Cited

U.S. PATENT DOCUMENTS

| | | |
|---|---|---|
| 3,455,743 A | 7/1969 | Huebscher et al. |
| 5,478,662 A | 12/1995 | Strasser |
| 6,602,624 B1 | 8/2003 | Doan et al. |
| 6,835,477 B1 | 12/2004 | Brambilla et al. |
| 6,841,292 B2 | 1/2005 | Nelson et al. |
| 6,866,955 B2 | 3/2005 | Lee et al. |
| 7,160,341 B2 | 1/2007 | Sinha et al. |
| 7,192,668 B2 | 3/2007 | Dehne |
| 7,264,895 B2 | 9/2007 | White |
| 7,759,010 B2 | 7/2010 | Hoch |
| 7,955,743 B2 | 6/2011 | Ganapathy et al. |
| 8,313,871 B2 | 11/2012 | Wexel et al. |
| 8,387,441 B2 | 3/2013 | Falta et al. |
| 8,603,654 B2 | 12/2013 | Cartwright et al. |
| 2004/0058224 A1 | 3/2004 | Eshraghi et al. |
| 2008/0050640 A1 | 2/2008 | Sun et al. |
| 2010/0190075 A1* | 7/2010 | Frost ................. H01M 8/04805 429/433 |
| 2011/0039190 A1 | 2/2011 | Owejan et al. |

(Continued)

*Primary Examiner* — Victoria H Lynch
(74) *Attorney, Agent, or Firm* — Quinn IP Law

(57) ABSTRACT

Presented are intelligent fuel cell systems (FCS) with logic for evacuating water from anode headers of a fuel cell stack, methods for making/using such systems, and vehicles equipped with such systems. A method of operating an FCS includes a system controller confirming the FCS is running and, once confirmed, receiving a bleed request to remove exhaust gas from exhaust output by the anode. Responsive to the bleed request, the controller determines a total bleed valve use (TBVU) indicating prior bleed requests completed by an anode bleed valve, and thereafter determines if the TBVU is less than a maximum bleed valve use (MBVU). If so, the controller responsively commands the bleed valve to bleed the exhaust gas from the anode exhaust. If TBVU is not less than MBVU, the controller commands a header drain valve to bleed the exhaust gas from the anode exhaust and drain water from the anode header.

20 Claims, 4 Drawing Sheets

(56) References Cited

U.S. PATENT DOCUMENTS

| | | |
|---|---|---|
| 2011/0207012 A1 | 8/2011 | Frost et al. |
| 2014/0335432 A1 | 11/2014 | Sinha et al. |
| 2015/0180079 A1 | 6/2015 | Leger et al. |
| 2017/0058420 A1 | 3/2017 | Goulet et al. |
| 2019/0252705 A1 | 8/2019 | Mathias et al. |

* cited by examiner

INTELLIGENT FUEL CELL SYSTEMS AND CONTROL LOGIC FOR SMART USE OF ANODE HEADER DRAIN VALVES FOR FCS BLEED AND DRAINAGE

INTRODUCTION

The present disclosure relates generally to electrochemical fuel cell systems for converting hydrogen-rich fuels into electricity. More specifically, aspects of this disclosure relate to active valve systems for removing excess water from sections of a fuel cell stack.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

Hybrid-electric and full-electric powertrains take on various architectures, some of which utilize a fuel cell system to supply the requisite power for one or more electric traction motors. A fuel cell is an electrochemical device generally composed of an anode electrode that receives hydrogen ($H_2$), a cathode electrode that receives oxygen ($O_2$), and an electrolyte interposed between the anode and cathode. An electrochemical reaction is induced to oxidize hydrogen molecules at the anode to generate free protons (H+), which are then transferred through the electrolyte for reduction at the cathode with an oxidizing agent, such as oxygen. In particular, hydrogen gas is catalytically split in an oxidation half-cell reaction in the anode catalyst layer to generate free hydrogen protons and electrons. These hydrogen protons pass through the electrolyte to the cathode, where the hydrogen protons react with oxygen and electrons in the cathode to form various stack by-products. Electrons from the anode, however, cannot pass through the electrolyte; these electrons are redirected through a load, such as a vehicle's traction motor or a non-vehicular load requiring high-voltage (HV) power generation, before being sent to the cathode.

Fuel cell designs commonly employed in automotive applications utilize a solid polymer electrolyte membrane (PEM)—also referred to as a "proton exchange membrane"—to provide ion transport between the anode and cathode. Proton exchange membrane fuel cells (PEMFC) generally employ a solid polymer electrolyte (SPE) proton-conducting membrane, such as a perfluorosulfonic acid membrane, to separate product gases and provide electrical insulation of electrodes, in addition to conduction of protons. The anode and cathode typically include finely dispersed catalytic particles, such as platinum, supported on carbon particles and mixed with an ionomer. This catalytic mixture is deposited on the sides of the membrane to form the anode and cathode layers. The combination of the anode catalytic layer, cathode catalytic layer, and electrolyte membrane define a membrane electrode assembly (MEA) in which the anode catalyst and cathode catalyst are supported on opposite faces of the ion conductive solid polymer membrane.

To generate the requisite electricity for powering a motor vehicle, numerous fuel cells are assembled into a fuel cell stack to achieve a higher output voltage and allow for stronger current draw. For example, a typical fuel cell stack for an automobile may have in excess of two hundred stacked fuel cells. These fuel cell stacks receive reactant gas as a cathode input, typically as a metered flow of ambient air or concentrated gaseous oxygen forced into the stack by a compressor. During normal operation, a quantifiable mass of the oxygen is not consumed by the stack; some of the remnant oxygen is output as cathode waste gas that may include water as a stack by-product. The fuel cell stack also receives hydrogen or hydrogen-rich reactant gas as an anode input that flows into the anode side of the stack. The distribution of hydrogen within the anode flow channels is typically held substantially constant for proper fuel cell stack operation. In some operational modes, supplementary hydrogen is fed into the fuel cell stack so that the anode gas is evenly distributed to achieve a calibrated stack output load. Additionally, a fuel cell stack may be operated in a manner that maintains the MEAS in a humidified state; gases supplied to the fuel cell stack may be humidified to prevent the drying and cracking of the membrane assemblies. Exhaust generated by the fuel cell stack may include water vapor, liquid water, air, low levels of waste hydrogen and nitrogen gasses, and other trace elements.

SUMMARY

Presented herein are intelligent fuel cell systems (FCS) with attendant control logic for selectively evacuating water from anode headers of a fuel cell stack, methods for manufacturing and methods for operating such systems, and motor vehicles equipped with such systems. By way of example, there are disclosed systems and methods for smart usage of anode header drain valves to eliminate dependency on tilt angle sensors for anode header water drainage. In a representative fuel cell architecture, there are three active fluid valves ported downstream from the anode stack: an anode outlet bleed (AOB) valve, an anode sump drain (ASD) valve, and an anode header drain (AHD) valve. The AOB valve may be a normally closed electronic valve that is fluidly connected to a sump volume downstream of the stack or anode outlet and selectively actuable to bleed nitrogen from the anode exhaust to an oxygen inlet line of the cathode or exhaust. Likewise, the ASD valve may be a normally closed electronic valve that is fluidly connected downstream from the anode sump volume and selectively actuable to drain water from the sump to a cathode inlet or exhaust outlet line. In contrast, the AHD valve may be a normally closed electronic valve that is fluidly connected to anode exhaust headers and selectively actuable to purge accumulated water from the headers to the cathode inlet or exhaust outlet line.

During FCS operation, hydrogen concentration within the anode electrode is systematically monitored to optimize system efficiency and avoid anode "H2 starvation." If the detected hydrogen concentration falls below a system-calibrated minimum H2 level (e.g., ~75%), a bleed request is generated to exhaust nitrogen from the anode exhaust until the hydrogen concentration rises above the minimum H2 level. Existing fuel cell systems employ a dedicated anode bleed valve for servicing all bleed requests. In the representative fuel cell architecture, however, the AOB valve is employed to service a predefined maximum number ($N_{BR}$) of consecutive bleed requests ($X_{BR}$); for a subsequent bleed request ($X_{BR}=N^{BR}+1$), the AHD valve is activated to bleed nitrogen from the anode exhaust and concomitantly drain accumulated water from the headers. Doing so functions to both prevent overaccumulation of water in the anode exhaust headers and exhaust a sufficient amount of nitrogen to ensure adequate hydrogen concentration at the anode. With this approach, the fuel cell system eliminates any dependance on an in-vehicle tilt angle sensor for determining when to drain the anode headers. At maximum operating power of the FCS, the AHD valve may replace the ASD valve for all bleed requests, e.g., to minimize power losses associated with voltage dips that may be caused by opening the bleed valve, e.g., if the AOB valve opens to a cathode inlet.

Attendant benefits for at least some of the disclosed concepts include an intelligent fuel cell system architecture and control scheme that increase system efficiency while reducing system cost by eliminating expensive and unreliable tilt angle sensors. By regularly draining accumulated water from the anode headers during system operation, as opposed to waiting for an FCS tilt or shutdown trigger for header purge, fuel cell durability is improved without compromising system efficiency. Disclosed FCS control techniques may also help to reduce system complexity while avoiding the time and expense for the creation, simulation, and proof of concept (PoC) of dedicated control logic for predicting the amount of water in the anode headers. Other attendant benefits may include mitigating system power losses during a maximum-power operating mode of the fuel cell system by eliminating voltage dips caused by opening the bleed valve at maximum power, e.g., if the AOB valve opens to the cathode inlet.

Aspects of this disclosure are directed to fuel cell control systems, system control logic, and closed-loop feedback control techniques for selective bleed and drainage of a fuel cell system. In an example, a method is presented for operating a fuel cell system that contains a fuel cell stack with one or more fuel cells each having an anode, a cathode, and a membrane sandwiched between the anode and cathode. The FCS also includes an anode outlet that is fluidly connected to an anode outlet port of the anode(s), and an anode header that is fluidly connected to the anode(s). This representative method includes, in any order and in any combination with any of the above and below disclosed options and features: receiving, e.g., via a resident or remote system controller, an FCS mode signal that indicates the fuel cell system is presently running; receiving, e.g., via the system controller after receiving the FCS mode signal, a bleed request to remove exhaust gases (e.g., $N_2$) from an anode exhaust in the anode outlet; determining, e.g., via the system controller responsive to receiving the bleed request, a total bleed valve use (TBVU) number equal to a sum of prior bleed requests completed by an anode bleed valve for removing the exhaust gas from the anode exhaust; determining, e.g., via the system controller using a resident or remote system memory device, if the TBVU number is less than a maximum bleed valve use (MBVU) number; transmitting, e.g., via the system controller to the anode bleed valve responsive to the TBVU number being less than the MBVU number, one or more first command signals to bleed the exhaust gas from the anode exhaust; and transmitting, e.g., via the system controller to a header drain valve responsive to the TBVU number not being less than the MBVU number, one or more second command signals to bleed the exhaust gas from the anode exhaust and drain water from the anode header.

Aspects of this disclosure are also directed to computer-readable media (CRM) for operating an AHD valve in cooperation with a AOB valve to bleed anode exhaust and drain an anode header of an FCS without use of a tilt sensor. In an example, non-transitory CRM stores instructions executable by one or more processors of a system controller, such as a dedicated fuel cell control (FCC) module. These instructions, when executed by the processor(s), cause the system controller to perform operations, including: receiving an FCS mode signal indicating the fuel cell system is running; receiving a bleed request to remove an exhaust gas from an anode exhaust in an anode outlet; determining, responsive to receiving the bleed request, a total bleed valve use number equal to a sum of prior bleed requests completed by an anode bleed valve for removing the exhaust gas from the anode exhaust; determining if the TBVU number is less than a maximum bleed valve use number; commanding the anode bleed valve to bleed the exhaust gas from the anode exhaust responsive to the TBVU number being less than the MBVU number; and commanding a header drain valve to bleed the exhaust gas from the anode exhaust and drain water from the anode header responsive to the TBVU number not being less than the MBVU number.

Additional aspects of this disclosure are directed to intelligent motor vehicles equipped with fuel cell systems having improved anode header drainage capabilities. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. For non-automotive applications, disclosed FCS may be implemented for all logically relevant uses, including stand-alone power stations, portable power packs, backup generator systems, pumping equipment, residential use, electric vehicle charging stations (EVCS), etc. In an example, an electric-drive vehicle includes a vehicle body with a passenger compartment, multiple road wheels mounted to the vehicle body (e.g., via corner modules coupled to a unibody or body-on-frame chassis), and other standard original equipment. One or more electric traction motors operate alone (e.g., for FEV powertrains), or in conjunction with an engine assembly (e.g., for HEV powertrains) to selectively drive one or more of the road wheels to propel the vehicle. A fuel cell system with a stack of electrochemical fuel cells is mounted onto the vehicle body and operable to generate electrical power for running the traction motor(s).

Continuing with the discussion of the preceding example, the vehicle employs one or more of a dedicated or shared or central controller or control module or network of controllers/modules (collectively "controller") to govern operation of the vehicle's FCS. The controller is programmed to receive one or more FCS mode signals that confirm the fuel cell system is presently running and, once confirmed, to receive one or more bleed requests to remove an exhaust gas from an anode exhaust in an anode outlet of the FCS. Responsive to receipt of the bleed request, the controller then determines a TBVU number indicating the number of prior bleed requests that were completed by an anode bleed valve and thereafter determines if the TBVU number is less than the MBVU number. If so, the controller responsively transmits one or more command signals to the anode bleed valve to bleed exhaust gas from the anode exhaust. If the TBVU number is not less than the MBVU number, the controller responsively transmits one or more command signals to a header drain valve to bleed exhaust gas from the anode exhaust and drain water from the anode header.

For any of the disclosed systems, methods, and vehicles, the anode bleed valve may selectively fluidly couple the anode outlet to a cathode inlet, which is connected to a cathode inlet port through which oxygen is fed into the cathode(s) of the FCS. In this instance, the header drain valve may selectively fluidly couple the anode header to a cathode outlet or exhaust, which is connected to a cathode outlet port through which cathode exhaust is evacuated from the cathode(s). As yet a further option, the anode outlet may include an anode sump that stows water extracted from the anode exhaust. In this instance, the anode bleed valve may be connected to an upper portion of the anode sump; the bled exhaust gas includes nitrogen that has accumulated within the anode side of the stack. A sump drain valve, which may be connected to a lower portion of the anode sump, is operable to selectively fluidly connect the anode sump to the cathode inlet or exhaust. The system controller may selectively command the sump drain valve to drain water from the anode sump, e.g., in conjunction with operation of the AOB valve and/or the AHD valve.

For any of the disclosed systems, methods, and vehicles, the FCS mode signal may indicate a contemporaneous powering on of the fuel cell system. Each time the fuel cell system is powered on, the system controller may responsively set the TBVU number to zero. In the same vein, the system controller may responsively set the TBVU number to zero each time the header drain valve bleeds exhaust gas from the anode exhaust and drains water from the anode header or after using the ARDS valve for a preset number of times. As yet a further option, the system controller may responsively increment by one the TBVU number each time the anode bleed valve bleeds exhaust gas from the anode exhaust.

For any of the disclosed systems, methods, and vehicles, the system controller may determine an active cycle time for the header drain valve. This active cycle time may include a phase detection time ($\Delta t1$) for draining water from the anode header and a bleed time ($\Delta t2$) for bleeding exhaust gas from the anode exhaust. In this instance, the system controller may determine if the phase detection time is greater than a predefined tilt detection threshold; if so, the system controller may responsively transmit an electronic notification indicating the fuel cell system is in an FCS tilt scenario. As another option, the system controller may determine if the phase detection time is greater than a predefined header overfill threshold; if so, the system controller may responsively decrement the MBVU number, e.g., by one or more. The active cycle time may be calculated as a variable total duration time as a function of the phase detection time, which may be dependent upon a voltage output of the fuel cell system or a valve gas flow estimation, and the bleed time, which may be dependent upon a detected hydrogen concentration within the anode.

For any of the disclosed systems, methods, and vehicles, receiving a bleed request may include the system controller receiving, from a model estimated anode H2 concentration or from an H2 sensor connected to the anode-side of the FCS, data that indicates a detected hydrogen concentration within the anode is below a predefined minimum hydrogen level. The second phase of the AHD valve's active cycle may be terminated once the FCS achieves the predefined minimum hydrogen level. By comparison, the first phase of the AHD valve's active cycle may be terminated once the FCS achieves a system-calibrated minimum voltage output level. As another option, the FCS mode signal may indicate the fuel cell system is running by indicating the fuel cell system is turned on, is outputting electrical power, and/or is conducting a system management control operation.

The above Summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
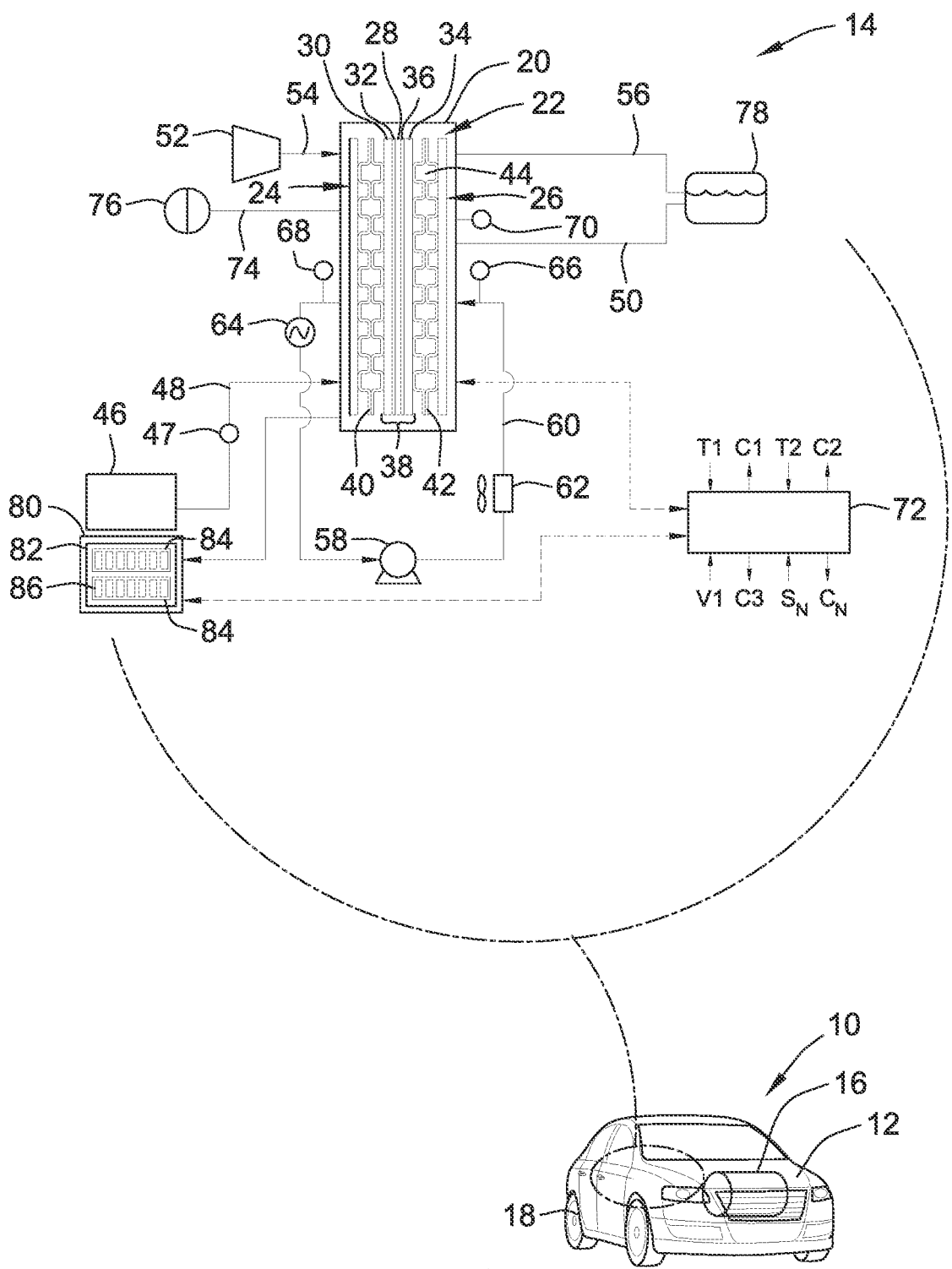
FIG. 1 is an elevated, perspective-view illustration of a representative motor vehicle with an inset schematic illustration of an example of a fuel cell system in accord with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, full-electric automobile. The illustrated automobile 10—also referred to herein as "motor vehicle" or "vehicle" for short—is merely an exemplary application with which novel aspects of this disclosure may be practiced. In the same vein, incorporation of the present concepts into an FEV powertrain should be appreciated as a non-limiting implementation of disclosed features. As such, it will be understood that aspects and features of this disclosure may be applied to other powertrain architectures, incorporated into any logically relevant type of motor vehicle, and utilized for both automotive and non-automotive applications alike. Moreover, only select components of the motor vehicles and fuel cell systems are shown and described in additional detail herein. Nevertheless, the vehicles and systems discussed below may include numerous additional and alternative features, and other available peripheral components, for carrying out the various methods and functions of this disclosure.

Packaged within the vehicle body 12 of automobile 10 is a representative fuel cell system 14 for powering one or more traction motors, such as electric motor generator unit (MGU) 16, operable for driving a combination of the vehicle's road wheels 18. Proton exchange membrane fuel cell system 14 of FIG. 1 is equipped with one or more fuel cell stacks 20, each of which is composed of multiple fuel cells 22 of the PEM type that are connected in electrical series or parallel with one another. In the illustrated architecture, each fuel cell 22 is a multi-layer construction with an anode side 24 and a cathode side 26 that are separated by a proton-conductive perfluorosulfonic acid membrane 28. An anode diffusion media layer 30 is provided on the anode side 24 of the PEMFC 22, with an anode catalyst layer 32 interposed between and operatively connecting the membrane 28 and corresponding diffusion media layer 30. Likewise, a cathode diffusion media layer 34 is provided on the cathode side 26 of the PEMFC 22, with a cathode catalyst layer 36 interposed between and operatively connecting the membrane 28 and corresponding diffusion media layer 34. The two catalyst layers 32 and 36 cooperate with the membrane 28 to define, in whole or in part, a membrane electrode assembly (MEA) 38.

The diffusion media layers 30 and 34 are porous constructions that provide for fluid inlet transport to and fluid exhaust transport from the MEA 38. An anode flow field plate (or "first plate") 40 is provided on the anode side 24 in abutting relation to the anode diffusion media layer 30. In the same vein, a cathode flow field plate (or "second plate") 42 is provided on the cathode side 26 in abutting relation to the cathode diffusion media layer 34. Coolant flow channels 44 traverse each of the plates 40 and 42 to allow cooling fluid to flow through the fuel cell 22. Fluid inlet ports and headers direct a hydrogen-rich fuel and an oxidizing agent to passages in the anode and cathode flow field plates 40, 42. A central active region of the anode's plate 40 that confronts the proton-conductive membrane 28 may be fabricated with an anode flow field composed of serpentine flow channels for distributing hydrogen over an opposing face of the membrane 28. The MEA 38 and plates 40, 42 may be stacked together between stainless steel clamping plates and monopolar end plates (not shown). These clamping plates may be electrically insulated from the end plates by a gasket or dielectric coating. The fuel cell system 14 may also employ anode recirculation where an anode recirculation gas is fed from an exhaust manifold or headers through an anode recirculation line for recycling hydrogen back to the anode side 24 input so as to conserve hydrogen gas in the stack 20.

Hydrogen ($H_2$) inlet flow—be it gaseous, concentrated, entrained, or otherwise—is transmitted from a hydrogen source, such as fuel storage tank 46, to the anode side 24 of the fuel cell stack 20 via a fluid injector 47 coupled to a (first) fluid intake conduit or hose 48. Anode exhaust exits the stack 20 via a (first) fluid exhaust conduit or hose 50. Although shown on the inlet side of the stack, a compressor or pump 52 provides a cathode inlet flow, such as ambient air and/or concentrated gaseous oxygen ($O_2$), via a (second) fluid intake line or manifold 54 to the cathode side 26 of the stack 20. Cathode exhaust is output from the stack 20 via a (second) fluid exhaust conduit or manifold 56. Flow control valves, flow restrictions, filters, and other available devices for regulating fluid flow can be implemented by the PEMFC system 14 of FIG. 1. Electricity generated by the fuel cell stack(s) 20 and output by the fuel cell system 14 may be transmitted for storage to an in-vehicle traction battery pack 82 within a rechargeable energy storage system (RESS) 80.

Fuel cell system 14 of FIG. 1 may also include a thermal sub-system operable for controlling the temperature of the fuel cell stack 20 during preconditioning, break-in, and post-conditioning. According to the illustrated example, a cooling fluid pump 58 pumps a cooling fluid through a coolant loop 60 to the fuel cell stack 20 and into the coolant channels 44 in each cell 22. A radiator 62 and an optional heater 64 fluidly coupled in the coolant loop 60 are used to maintain the stack 20 at a desired operating temperature. This fuel cell conditioning system may be equipped with various sensing devices for monitoring system operation and progress of fuel cell break-in. For instance, a (first) temperature sensor 66 monitors a temperature value of the coolant at a coolant inlet to the fuel cell stack 20, and a (second) temperature sensor 68 measures a temperature value of the coolant at a coolant outlet of the stack 20. An electrical connector or cable 74 connects the fuel cell stack 20 to an electric power load 76, which may be employed to draw a current from each cell 22 in the stack 20. A voltage/current sensor 70 is operable to measure, monitor, or otherwise detect fuel cell voltage and/or current across the fuel cells 22 in the stack 20.

Programmable electronic control unit (ECU) 72 helps to control operation of the fuel cell system 14. As an example, ECU 72 receives one or more temperature signals T1 from one or more of the temperature sensors 66, 68 that indicate the temperature of the fuel cell stack 20; ECU 72 may be programmed to responsively issue one or more command signals C1 to modulate operation of the stack 20. ECU 72 of FIG. 1 also receives one or more voltage signals V1 from the voltage sensor/current 70; ECU 72 may be programmed to responsively issue one or more command signals C2 to modulate operation of the hydrogen source 46 and/or compressor/pump 52 to thereby regulate the electrical output of the stack 20. ECU 72 of FIG. 1 is also shown receiving one or more coolant temperature signals T2 from sensor 66 and/or 68; ECU 72 may be programmed to responsively issue one or more command signals C3 to modulate operation of the fuel cell's thermal system. Additional sensor signals $S_N$ may be received by, and additional control commands $C_N$ may be issued from the ECU 72, e.g., to control any other sub-system or component illustrated and/or described herein. The ECU 72 may emit a command signal to transmit evolved hydrogen and liquid $H_2O$ from the cathode side 26 through fluid exhaust conduit 56 to a water separator 78 (FIG. 1) where hydrogen and water from the cathode are combined with depleted hydrogen exhausted from the anode through fluid exhaust conduit 50.

With continuing reference to FIG. 1, the traction battery pack 82 contains an array or rechargeable lithium-class (secondary) battery modules 84. Aspects of the disclosed concepts may be similarly applicable to other electric storage unit architectures, including those employing nickel metal hydride (NiMH) batteries, lead acid batteries, lithium metal batteries, or other applicable type of rechargeable electric vehicle battery (EVB). Each battery module 84 may include a series of electrochemical battery cells, such as pouch-type lithium ion (Li-ion) or Li-ion polymer battery cells 86. An individual Li-ion battery module 84, for example, may be typified by a grouping of 10-45 battery cells that are stacked in side-by-side facing relation with one another and connected in parallel or series for storing and supplying electrical energy. While described as a silicon-based, Li-ion "pouch cell" batteries, the cells 86 may be adapted to other constructions, including cylindrical and prismatic constructions.

Figure 2:
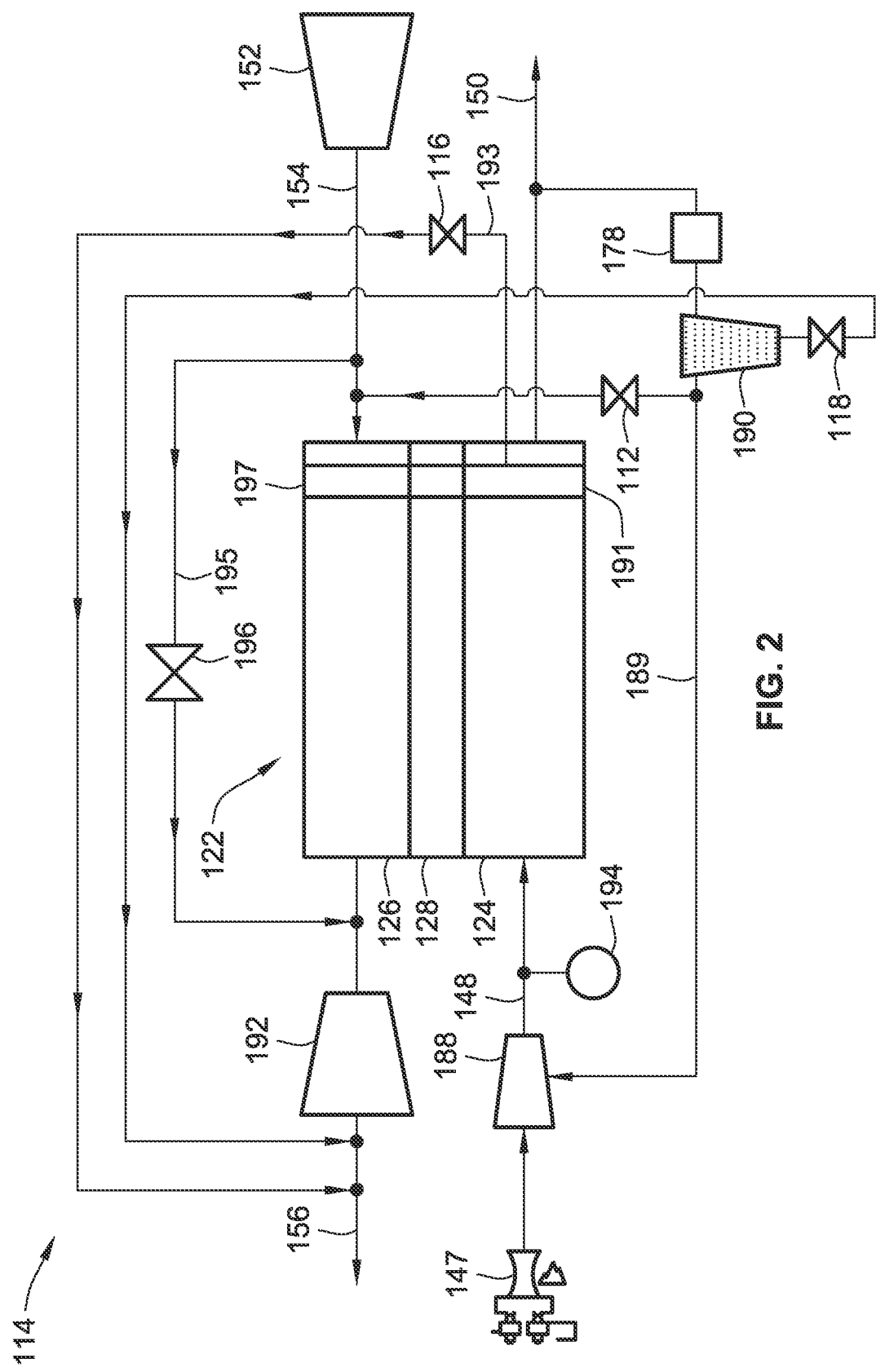
FIG. 2 is a schematic illustration of a representative intelligent fuel cell system with an active valve system architecture having smart bleed and drainage capabilities in accord with aspects of this disclosure.

Turning next to FIG. 2, there is shown a schematic illustration of a fuel cell system 114 for converting a hydrogen-rich fuel and an oxidizing agent into electricity through a redox reaction. Although differing in appearance, it is envisioned that any of the features and options described above with reference to the fuel cell system 14 of FIG. 1 may be incorporated, singly or in any combination, into the fuel cell system 114 of FIG. 2, and vice versa. As a point of similarity, the fuel cell system 114 contains multiple individual fuel cells 122 that are stacked, in face-to-face relation, one on top of the other. Each fuel cell 122 may be substantially identical to one another and may contain those elements illustrated in FIG. 1 and explained above with respect to fuel cell 22. For instance, each individual fuel cell 122 may employ an anode electrode 124, a cathode electrode 126, and an ion-exchange membrane 128 sandwiched between the anode 124 and cathode 126.

Other representative points of similarity between the fuel cell system 14 of FIG. 1 and the fuel cell system 114 of FIG. 2 may include a fluid injector assembly 147 in serial fluid-flow communication with a fluid ejector assembly 188, both of which are coupled to an anode inlet port via an anode intake line 148. Implementing a system-calibrated injector active cycle, the fluid injector 147 provides hydrogen pulsing through intake line 148 to the anode-side flow field in the stack of fuel cells 122. The width and frequency of the pulses for the injector 147 control how much hydrogen gas is input to the cells 122 for a requested FCS power density. Anode exhaust gas is discharged from the stack of fuel cells 122 on an anode exhaust line 150, with some of the exhaust expelled from the FCS (e.g., in an open exhaust system) or all of the exhaust redirected through a recirculation line 189 to a water separator 178 and an anode sump 190 (e.g., in a closed exhaust system). The water separator 178 removes entrained water from the anode exhaust and stores the separated liquid water in the anode sump 190. The "dried" anode exhaust is then recirculated back to the fluid ejector 188, which mixes the exhaust with "fresh" hydrogen from a hydrogen source (e.g., storage tank 46 of FIG. 1) on the intake line 148. An in-line pressure sensor 194 monitors anode inlet pressure and outputs sensor data indicative thereof to a system controller (e.g., ECU 72).

On the cathode side of the fuel cell system 114, a fluid compressor assembly 152 transmits compressed ambient air or tank-stored, oxygen-rich fuel through a cathode intake line 154 and a cathode inlet port to the cathode side flow-field of the cells 122. Cathode exhaust is discharged from the fuel cells 122 on a cathode exhaust line 156. Gases exiting the cathode electrodes 126 are hot and may be passed through by an isothermal expander assembly 192, which may cool and expand the exhaust gases. A bypass valve 196 is provided on a cathode bypass line 195 that directly connects the cathode intake line 154 to the cathode exhaust line 156, e.g., upstream from the expander 192, such that metered amounts of air/fuel may circumvent the stack of fuel cells 122.

Downstream from the anode side of the fuel cell 122 stack is an array of active valving devices for governing the bleed and drainage of anode exhaust byproducts from the fuel cell system 114. An anode outlet bleed (AOB) valve 112, for example, is fluidly connected to an upper portion of the anode sump 190 and controller actuable to remove exhaust gases from the anode exhaust, such as nitrogen ($N_2$) entrained in unused hydrogen ($H_2$). In accord with the illustrated example, the AOB valve 112 selectively fluidly couples the anode sump 190 on the recirculation line 189 at the outlet of the anode 124 to the cathode intake line 154 at the inlet to the cathode 126. An anode sump drain (ASD) valve 118 is fluidly connected to a lower portion of the anode sump 190 and controller actuable to remove exhaust-borne liquids from the anode exhaust, such as waste water separated from the exhaust. As shown, the ASD valve 118 selectively fluidly couples the anode sump 190 to the cathode exhaust line 156 at an outlet of the cathode 126. The disclosed valves may take on any suitable fluid valve configuration, including electromagnetic solenoid valve devices and motor-driven ball valve devices.

Select components of the fuel cell 122 stack, including membrane cavities, end plate openings, internal gaskets, etc., align with complementary openings in the bipolar plates to together form headers for supplying and removing gaseous reactants and liquid coolant to and from the fuel cells 122. In the embodiment shown in FIG. 2, for example, openings in the series of stacked fuel cells 122 form an anode exhaust header 191 through which anode exhaust is accumulated and transferred to the recirculation line 189, and a cathode exhaust header 197 through which cathode exhaust is accumulated for expulsion from or recirculation through the fuel cell 122 stack. An anode header drain (AHD) valve 116 is fluidly connected via an anode header drain line 193 to the anode exhaust header 191 and controller actuable to remove exhaust gases and liquids that have accumulated within the anode exhaust header 191. In accord with the illustrated example, the AHD valve 116 selectively fluidly couples the anode exhaust header 191 to the cathode exhaust line 156 downstream from the expander 192. While not shown, the fuel cell assembly 114 may also include anode, cathode, and coolant inlet headers to transport cathode gas, anode gas, and coolant fluid, respectively, through the fuel cell 122 stack, as well as cathode and coolant outlet headers for transporting cathode affluent and coolant affluent, respectively, through the fuel cell 122 stack. Additional information regarding supply and exhaust headers of fuel cell systems may be found, for example, in U.S. Pat. No. 7,781,087 B2, to Rock, et al., and 9,634,340 B2, to Martincheck et al., which are incorporated herein by reference in their entireties and for all purposes.

Anode header drain valves are generally dedicated to draining water that has accumulated in the anode headers to avoid fuel cell stack durability issues that may occur while the FCS is perceptibly tilted (e.g., when vehicle 10 is on a steep gradient). However, pre-existing control strategies for activating an anode header drain valve rely on either a vehicle tilt angle sensor or a notification of system shutdown as the impetus for triggering header drainage. However, vehicle tilt angle sensors are oftentimes inaccurate and unreliable, and system shutdown triggers are oftentimes ineffective for prolonged FCS use; both control schemes may lead to flooding of the anode exhaust headers.

Figure 3:
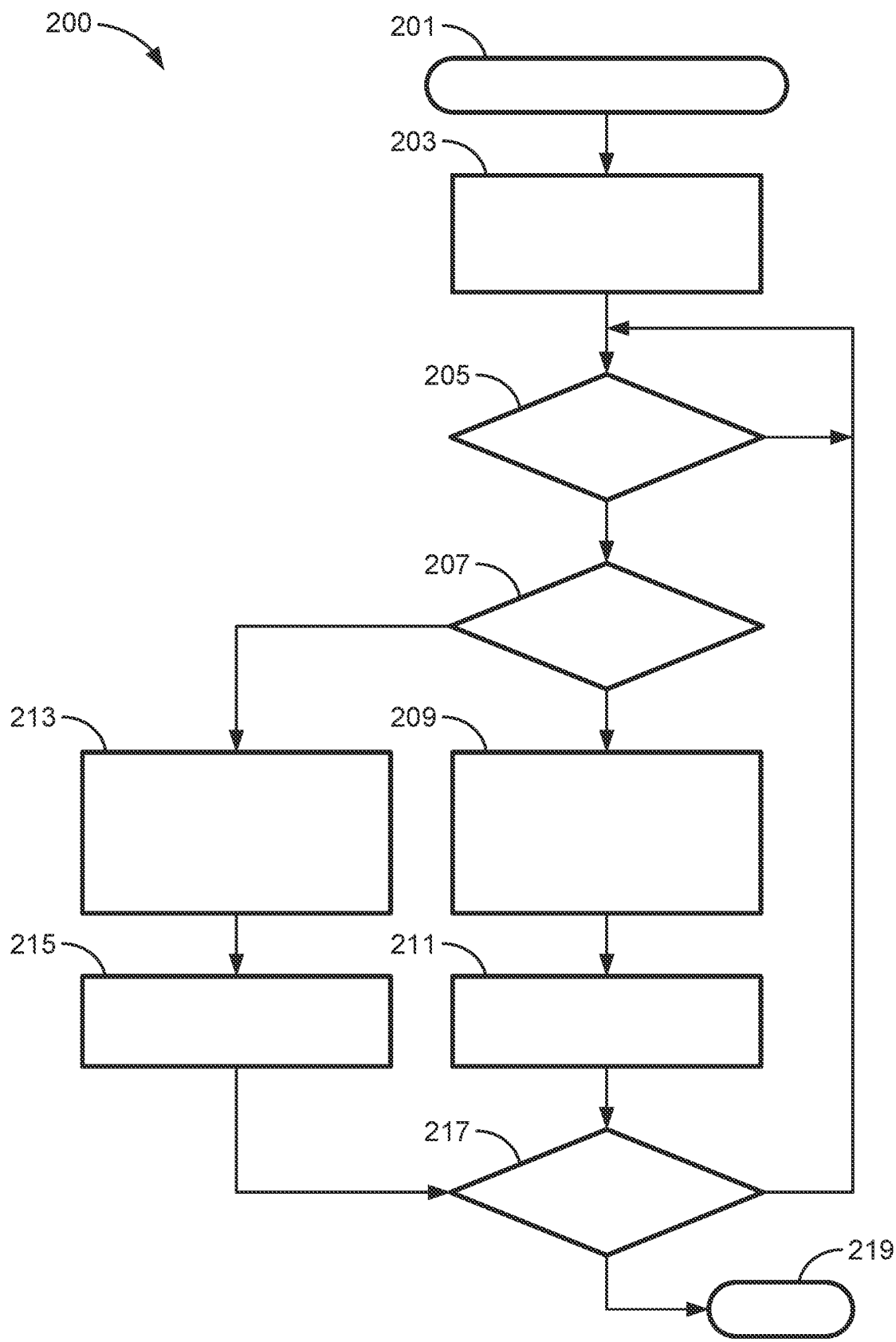
FIG. 3 is a flowchart illustrating a representative valve control algorithm for cooperative operation of a bleed valve and a header drain valve for active bleeding of anode exhaust gases and drainage of anode header water, which may correspond to memory-stored instructions that are executable by a resident or remote controller, control-logic circuit, programmable control unit, or other integrated circuit (IC) device or network of devices in accord with aspects of the disclosed concepts.

The fuel cell and active valve system of FIG. 2, when operated in accordance with the control scheme of FIG. 3, provides anode header drainage that eliminates all dependency on tilt angle sensors and FCS shutdown for purging header-accumulated water. As will be explained in extensive detail below, the AHD valve 116 is systematically activated in response to select bleed requests and, in so doing, drains the anode exhaust headers and concomitantly bleeds the anode. For closed-loop feedback control, the anode header water drain time may be analyzed to predict the existence of an FCS tilt situation. Anode header drain valve usage, including both active cycle and frequency, may be actively adapted to avoid under draining of accumulated water. At maximum operating power, the AHD valve may replace the AOB bleed valve for all bleed requests, e.g., to minimize power losses associated with AOB activation if the AOB valve 112 opens to the cathode inlet. For further system improvement, when an end cell voltage of the last fuel cell in the stack is below an average cell voltage of all cells in the stack by a predefined differential, the AHD valve may be opened to militate against possible anode header flooding.

With reference next to the flow chart of FIG. 3, an improved method or control strategy for operating a distributed array of electronic fluid valves, such as AOB valve 112 and AHD valve 116 of FIG. 2, for active bleeding of anode exhaust gases and active drainage of accumulated header fluids of a fuel cell system, such as FCS 114 of FIG. 2, is generally described at 200 in accordance with aspects of the present disclosure. Some or all of the operations illustrated in FIG. 3, and described in further detail below, may be representative of an algorithm that corresponds to processor-executable instructions that are stored, for example, in main or auxiliary or remote memory, and executed, for example, by an electronic controller, processing unit, logic circuit, or other module or device or network of modules/devices, to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 200 begins at terminal block 201 with memory-stored, processor-executable instructions for a programmable controller or control module or similarly suitable processor to call up an initialization procedure for a FCS control protocol. This routine may be executed in real-time, near real-time, continuously, systematically, sporadically, and/or at regular intervals, for example, each 10 or 100 milliseconds during normal and ongoing operation of the fuel cell system. As yet another option, terminal block 201 may initialize responsive to a user command prompt, a resident vehicle controller prompt, or a broadcast prompt signal received from an "off-board" centralized vehicle services system. In accord with the illustrated example, an FCS controller may receive electronic notification confirming that the FCS is running at terminal block 201. The FCS 114 of FIG. 2, for example, may be deemed to be "running" when a "key on" signal is received to power on the FCS, the fuel cells 122 are actively generating electrical power, or the FCS is actively completing power management/H2-concentration management/water management/other controls. Upon completion of the control operations presented in FIG. 3, the method 200 may advance to terminal blocks 219 and temporarily terminate or, optionally, may loop back to terminal block 201 and run in a continuous loop.

After confirming that the fuel cell stack is presently running, method 200 advances to process block 203 and sets a total bleed valve use (TBVU) number to zero (X=0). The TBVU number is the mathematical sum of prior bleed requests that were completed by an anode bleed valve in order to remove a select exhaust gas from the anode exhaust. In the example of FIG. 2, a cache memory-stored TBVU counter tracks the number of times the AOB valve 112 expels N2 from the anode sump 190. In general, the anode bleed valve may be implemented to service most, but not all, received bleed requests; the header drain valve is used to service a limited number of bleed requests.

Method 200 of FIG. 3 proceeds to decision block 205 to determine if a bleed request is active. Generally speaking, a bleed request may be initiated to dump accumulated N2 from the anode-side of the fuel cell stack when the hydrogen concentration in the anodes is lower than a system-calibrated minimum allowed value (e.g., 75% min H2 concentration). Doing so helps to ensure a sufficient H2 concentration in the anodes of the stacked fuel cells in order to avoid anode "hydrogen starvation" and, at the same time, improve FCS efficiency. If a bleed request is not received (Block 205=NO), method 200 may run in a continuous loop until a bleed request is active or the FCS is powered down.

Upon determining that a bleed request is active (Block 205=YES), method 200 continues to decision block 207 and responsively determines if the TBVU number is less than a predefined maximum bleed valve use (MBVU) number. If the bleed valve usage count is less than the maximum allowed consecutive bleed valve uses (TBVU<MBVU), the bleed valve may be used to fulfil the current bleed request. The bleed valve may be employed for the preset MBVU number of times; the header drain valve will then be employed to fulfil a preset number of subsequent bleed requests. In a non-limiting example, the AOB valve 112 is employed to service a default four (4) consecutive bleed requests; the AHD valve 116 is employed to service every fifth bleed request (see, e.g., the time-domain plots of FIG. 4).

If the TBVU number is less than the predefined MBVU number (Block 207=YES), method 200 responsively executes process block 209 and activates the anode bleed valve to fulfil the current bleed request. In FIG. 2, for example, the AOB valve 112 is opened (e.g., via ECU 72 of FIG. 1) until a sufficient amount of nitrogen is evacuated from the anode sump 190, e.g., to bring the anode H2 concentration up to or above the min H2 concentration. This will ensure that little nitrogen is recirculated through the recirculation line 189 to the fluid ejector assembly 188, and through the intake line 148 into the anode electrode 124. After servicing the bleed request, method 200 advances from process block 209 to process block 211 and increments the TBVU count by one (X=X+1).

After determining that the TBVU number is not less than the predefined MBVU number (Block 207=NO), method 200 responsively executes process block 213 and activates the header drain valve to fulfil the current bleed request. In FIG. 2, for example, the AHD valve 116 is opened (e.g., via ECU 72 of FIG. 1) until most or all of the water accumulated within the anode exhaust header 191 is evacuated through the header drain line 193 and expelled from the fuel cell system 114 through the cathode exhaust line 156. Once the accumulated water is drained from the anode header 191, anode exhaust exiting the fuel cell 122 stack through the header 191 will likewise be evacuated by the AHD valve 116 through the header drain line 193 and expelled from the fuel cell system 114 through the cathode exhaust line 156. After servicing the bleed requests for a preset number of times, method 200 advances from process block 213 to process block 215 and resets the TBVU count back to zero (X=0). From process block 211/215, method 200 executes decision block 217 to determine if the fuel cell system is still running. If it is (Block 217=YES), method 200 loops back to decision block 205; if not (Block 217=NO), method 200 concludes at terminal block 219.

Figure 4:
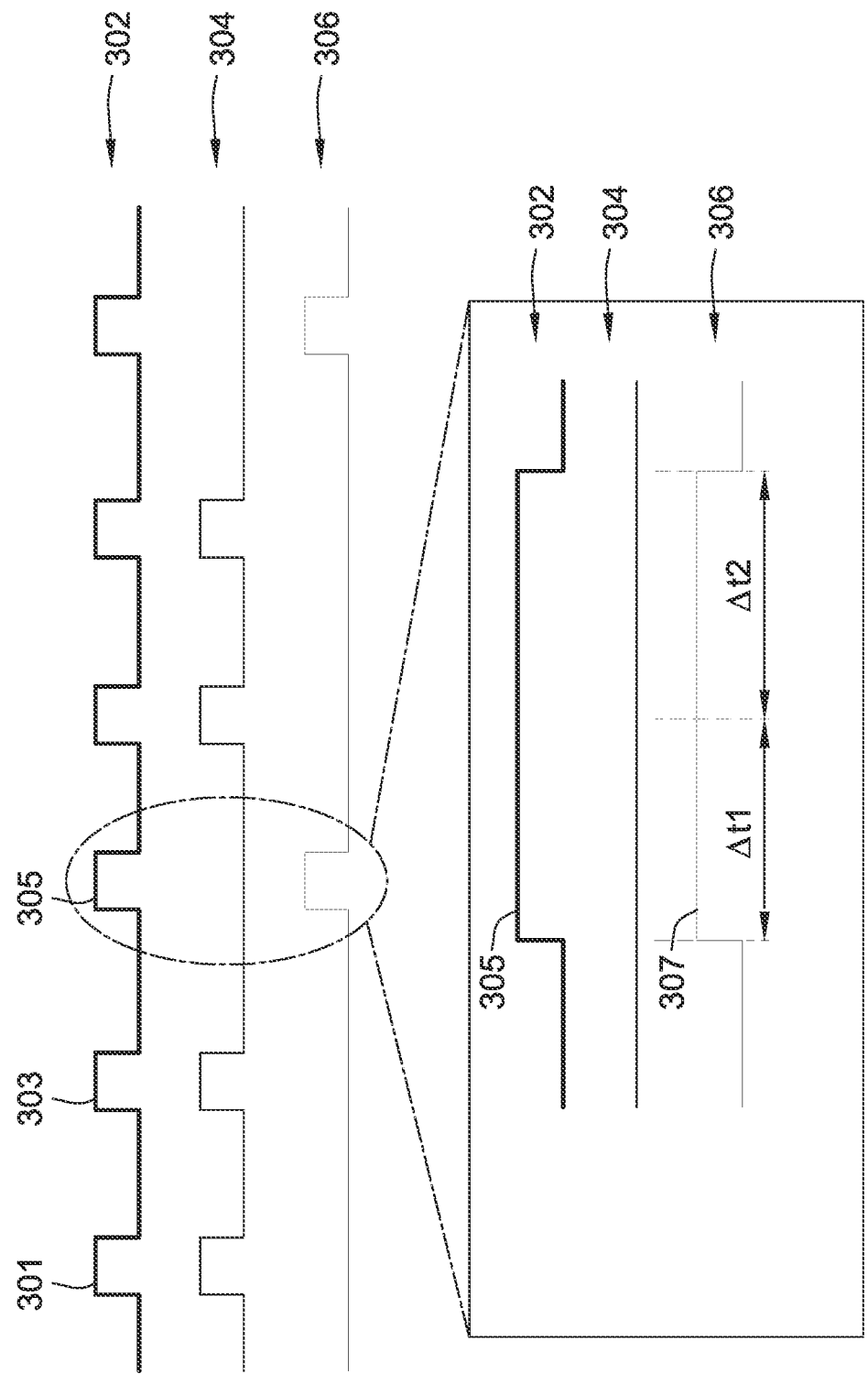
FIG. 4 presents three time-domain plots illustrating cooperative operation of a bleed valve and a header drain valve in response to FCS bleed requests to achieve anode header water drainage in accord with aspects of the disclosed concepts.

Presented in FIG. 4 are three time-domain plots that illustrate the cooperative operation of an anode bleed valve and an anode drain valve to service a series of FCS bleed requests to both bleed select gases from the anode exhaust and drain accumulated water from the anode headers. Specifically, a first time-domain plot 302 illustrates the sequential activation of a series of bleed requests over time, a second time-domain plot 304 illustrates the activation of a bleed valve in response to the bleed requests over time, and a third time-domain plot 306 illustrates the activation of a header drain valve in response to the bleed requests over time. In this non-limiting example, the bleed valve (e.g., AOB valve 112 of FIG. 2) is activated to carry out a first bleed request 301 and a second bleed request 303, and the header drain valve (e.g., AHD valve 116 of FIG. 2) is activated to carry out a third bleed request 305. As show, the maximum bleed valve use number is preset as two (2) and the header drain valve is employed for every third bleed request. It should be appreciated that the MBVU number may take on other default values, may be actively varied during system use, and may be set to zero for select system operations. Moreover, the frequency and active cycle for header drain valve activation may be varied from what is shown in FIG. 4, including servicing multiple consecutive bleed requests, all bleed requests, or no bleed requests.

Inset within FIG. 4 is an enlarged view of a discrete window of time in which the header drain valve is activated in accordance with a variable active cycle 307 in response to an active bleed request 305 while the bleed valve remains closed/deactivated. The active cycle 307 for the header drain valve is shown with two distinct operating phases: a phase detection time ($\Delta t1$) for draining accumulated water from the anode headers; and a bleed time ($\Delta t2$) for bleeding select gases from the anode exhaust. Each active cycle 307 may be calculated as a variable total duration of time as a function of the phase detection time ($\Delta t1$), which may be dependent upon a voltage output of the fuel cell system or a valve gas flow estimation, and the bleed time ($\Delta t2$), which may be dependent upon a detected hydrogen concentration within the anode.

One or both phase detection times may be monitored to predict when the FCS is in tilt and, if desired, to selectively vary the usage frequency of one or both valves. By way of example, and not limitation, a resident or remote system controller or control module may actively track the phase detection time ($\Delta t1$) for each corresponding bleed request and determine if that phase detection time exceeds a predefined system-calibrated tilt detection threshold (e.g., $t_{DC\_tilt}$=2 minutes). While there are assorted means for detecting when the anode header has been drained, including liquid-level sensors, fluid-phase detection sensors, etc., the system may monitor valve gas flow rate or FCS voltage output to predict when the anode headers are sufficiently drained and, thus, the duration of the phase detection time ($\Delta t1$). If the phase detection time exceeds the memory-stored tilt detection threshold ($\Delta t1 > t_{DC\_tilt}$), the system controller may responsively set a memory flag, output electronic notification indicating the fuel cell system is in an FCS tilt scenario, and/or estimating the tilt angle.

In addition to using the header drain valve as a sensing device for estimating FCS tilt, phase detection tracking of the header drain valve active cycle may also be used to selectively vary the frequency of use of the header drain valve to service bleed requests. For instance, a resident or remote system controller or control module may actively track the phase detection time ($\Delta t1$) for each corresponding bleed request and determine if the tracked phase detection time exceeds a predefined, system-calibrated header overfill threshold (e.g., $t_{DC\_over}$=1 minute). If so, the system controller may responsively decrement the MBVU number (e.g., by 1, 2, 3, etc.) such that the header drain valve is activated more frequently (e.g., every $3^{rd}$ bleed request instead of every $4^{th}$ bleed request). Conversely, if the phase detection time ($\Delta t1$) is progressively becoming shorter, e.g., falls below a predefined underfilled threshold, the MBVU number may be incremented by one or more and, thus, increase the usage frequency of the bleed valve while concurrently decreasing the usage frequency of the header drain valve.

Fuel cell system operation may be further improved by utilizing the header drain valve to service most or all bleed requests during select FCS operating conditions. By way of non-limiting example, at maximum system power output, the header drain valve may replace the bleed valve for substantially all bleed requests, e.g., to eliminate and power losses associated with voltage dips that are caused by operating the bleed valve during max-power operation if the outlet of the bleed valve connects to the cathode inlet but the outlet of the header drain valve connects to the exhaust. As yet a further option, the system controller/control module may actively track: (1) an end-cell voltage or a minimum cell voltage of a first/last fuel cell or a set of first/last fuel cells in the cell stack; and (2) an average cell voltage for all fuel cells in the cell stack. If the end-cell voltage or minimum cell voltage drops below the average cell voltage by a preset threshold value, the header drain valve may be forced open to ensure there is no flooding in the anode headers. When the end-cell voltage or minimum cell voltage recovers (e.g., is equal to or within the preset threshold value of the average cell voltage), any potential anode header flooding has been mitigated and the header drain valve is responsively closed. If the end-cell voltage or minimum cell voltage does not recover within a predefined window of time, a service request flag may be set and/or an electronic notification may be issued to prompt the user to service the FCS as the problem was not caused by anode header flooding.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a fuel cell system (FCS) including a fuel cell having an anode, a cathode, and a membrane, an anode outlet connected to an anode outlet port of the anode, and an anode header connected to the anode, the method comprising:
   receiving, via a system controller, an FCS mode signal indicating the fuel cell system is running;
   receiving, via the system controller after receiving the FCS mode signal, a bleed request to remove an exhaust gas from an anode exhaust in the anode outlet;
   determining, via the system controller responsive to receiving the bleed request, a total bleed valve use (TBVU) number equal to a sum of prior bleed requests completed by an anode bleed valve for removing the exhaust gas from the anode exhaust;
   determining, via the system controller using a system memory device, if the TBVU number is less than a maximum bleed valve use (MBVU) number;
   transmitting, via the system controller to the anode bleed valve responsive to the TBVU number being less than the MBVU number, a first command signal to bleed the exhaust gas from the anode exhaust; and
   transmitting, via the system controller to a header drain valve responsive to the TBVU number not being less than the MBVU number, a second command signal to bleed the exhaust gas from the anode exhaust and drain water from the anode header.

2. The method of claim 1, wherein the anode bleed valve selectively fluidly couples the anode outlet to a cathode inlet connected to a cathode inlet port through which oxygen is fed into the cathode, and wherein the header drain valve selectively fluidly couples the anode header to a cathode outlet connected to a cathode outlet port through which cathode exhaust is evacuated from the cathode.

3. The method of claim 1, wherein the FCS mode signal further indicates a contemporaneous powering on of the fuel cell system, the method further comprising setting the TBVU number to zero responsive to the contemporaneous powering on of the fuel cell system.

4. The method of claim 1, further comprising setting the TBVU number to zero responsive to the header drain valve bleeding the exhaust gas from the anode exhaust and draining the water from the anode header.

5. The method of claim 1, further comprising incrementing by one the TBVU number responsive to the anode bleed valve bleeding the exhaust gas from the anode exhaust.

6. The method of claim 1, further comprising determining an active cycle time for the header drain valve, the active cycle time including a phase detection time to drain the water from the anode header and a bleed time to bleed the exhaust gas from the anode exhaust.

7. The method of claim 6, further comprising:
   determining, via the system controller, if the phase detection time is greater than a predefined tilt detection threshold; and
   transmitting, via the system controller responsive to the phase detection time being greater than the predefined tilt detection threshold, an electronic notification indicating the fuel cell system is in an FCS tilt scenario or estimating a title angle.

8. The method of claim 6, further comprising:
   determining, via the system controller, if the phase detection time is greater than a predefined header overfill threshold; and
   decrementing, via the system controller responsive to the phase detection time being greater than the predefined header overfill threshold, the MBVU number.

9. The method of claim 6, wherein determining the active cycle includes calculating a variable total duration time of the active cycle as a function of the phase detection time, which is dependent upon a voltage output of the fuel cell system or a valve gas flow rate, and the bleed time, which is dependent upon a detected hydrogen concentration within the anode.

10. The method of claim 1, wherein the anode outlet includes an anode sump storing water extracted from the anode exhaust, the anode bleed valve is connected to the anode sump, and the exhaust gas includes nitrogen accumulated within the anode.

11. The method of claim 1, wherein the FCS includes a stack of the fuel cells, and wherein the method further comprises:
   determining an end-cell voltage or a minimum cell voltage for an end fuel cell or a set of ends fuel cells in the stack of the fuel cells;
   determining an average cell voltage for all of the fuel cells in the stack; and
   responsive to the end-cell voltage or the minimum cell voltage dropping below the average cell voltage by a preset threshold value, opening the header drain valve.

12. The method of claim 1, wherein receiving the bleed request includes receiving, via the system controller from a model-estimated anode H2 concentration or an H2 sensor connected to the anode, data indicating a detected hydrogen concentration within the anode is below a predefined minimum hydrogen level.

13. The method of claim 1, wherein the FCS mode signal indicating the fuel cell system is running includes the fuel cell system being turned on, outputting electrical power, and/or conducting a system management control operation.

14. The motor vehicle of claim 1, comprising:
   determining if the FCS system is operating at a maximum system power output; and
   commanding the header drain valve to bleed the exhaust gas from the anode exhaust and drain water from the anode header for all bleed requests received while the FCS system is operating at the maximum system power output.

15. A non-transitory, computer-readable medium storing instructions executable by one or more processors of a system controller of a fuel cell system (FCS), the FCS including a fuel cell having an anode, a cathode, and a membrane, an anode outlet connected to an anode outlet port of the anode, and an anode header connected to the anode, the instructions, when executed by the one or more processors, causing the system controller to perform operations comprising:
   receiving an FCS mode signal indicating the fuel cell system is running;
   receiving a bleed request to remove an exhaust gas from the anode outlet;
   determining, responsive to receiving the bleed request, a total bleed valve use (TBVU) number equal to a sum of prior bleed requests completed by an anode bleed valve for removing the exhaust gas from the anode outlet; determining if the TBVU number is less than a maximum bleed valve use (MBVU) number; commanding the anode bleed valve to bleed the exhaust gas from the anode outlet responsive to the TBVU number being less than the MBVU number; and commanding a header drain valve to bleed the exhaust gas from the anode outlet and drain water from the anode header responsive to the TBVU number not being less than the MBVU number.

16. A motor vehicle, comprising: a vehicle body; a plurality of road wheels attached to the vehicle body; a traction motor attached to the vehicle body and operable to drive one or more of the road wheels to thereby propel the motor vehicle; a fuel cell system (FCS) attached to the vehicle body and operable to power the traction motor, the FCS including a fuel cell with a cathode, an anode, and a proton exchange membrane disposed between the cathode and anode, the FCS further including an anode outlet connected to an anode outlet port of the anode, and an anode header connected to the anode; and an FCS system controller programmed to: receive an FCS mode signal indicating the fuel cell system is running; receive a bleed request to remove an exhaust gas from the anode outlet; responsive to receiving the bleed request, determine a total bleed valve use (TBVU) number equal to a sum of prior bleed requests completed by an anode bleed valve for removing the exhaust gas from the anode outlet; determine if the TBVU number is less than a maximum bleed valve use (MBVU) number; responsive to the TBVU number being less than the MBVU number, transmit a first command signal to the anode bleed valve to bleed the exhaust gas from the anode outlet; and responsive to the TBVU number not being less than the MBVU number, transmit a second command signal to a header drain valve to bleed the exhaust gas from the anode outlet and drain water from the anode header.

17. The motor vehicle of claim 16, wherein the anode bleed valve selectively fluidly couples the anode outlet to a cathode inlet connected to a cathode inlet port through which oxygen is fed into the cathode, and wherein the header drain valve selectively fluidly couples the anode header to a cathode outlet connected to a cathode outlet port through which cathode exhaust is evacuated from the cathode.

18. The motor vehicle of claim 16, wherein the FCS system controller is further programmed to:
   set the TBVU number to zero responsive to the header drain valve bleeding the exhaust gas from the anode exhaust and draining the water from the anode header; and
   increment by one the TBVU number responsive to the anode bleed valve bleeding the exhaust gas from the anode exhaust.

19. The motor vehicle of claim 16, wherein the FCS system controller is further programmed to determine an active cycle time for the header drain valve, the active cycle including a phase detection time to drain the water from the anode header and a bleed time to bleed the exhaust gas from the anode exhaust.

20. The motor vehicle of claim 19, wherein the FCS system controller is further programmed to:
   determine if the phase detection time is greater than a predefined tilt detection threshold; and
   transmit, responsive to the phase detection time being greater than the predefined tilt detection threshold, an electronic notification indicating the fuel cell system is in an FCS tilt scenario or estimating a tilt angle.

* * * * *